(12) United States Patent
Weber

(10) Patent No.: US 6,481,265 B1
(45) Date of Patent: Nov. 19, 2002

(54) METHOD AND APPARATUS FOR DETECTING LEAKS

(76) Inventor: Gunther Weber, 28050 Speidel Rd., East Rochester, OH (US) 44625

( * ) Notice: Subject to any disclaimer, the term of this patent is extended or adjusted under 35 U.S.C. 154(b) by 0 days.

(21) Appl. No.: 09/707,484

(22) Filed: Nov. 7, 2000

(51) Int. Cl.$^7$ ................................................. G01M 3/04
(52) U.S. Cl. ........................................ 73/40; 73/40.5 R
(58) Field of Search ............................... 73/40, 40.5 R, 73/47, 49.2, 49.3, 204.27

(56) References Cited

U.S. PATENT DOCUMENTS

| | | | | |
|---|---|---|---|---|
| 2,701,960 A | * | 2/1955 | Irwin | 73/40.5 R |
| 2,731,826 A | * | 1/1956 | Wiley | 73/40.5 R |
| 3,625,049 A | * | 12/1971 | Mills et al. | 73/49.2 |
| 3,782,172 A | * | 1/1974 | McCarron | 73/40.5 R |
| 4,050,291 A | * | 9/1977 | Nelson | 73/38 |
| 5,228,329 A | * | 7/1993 | Dennison | 73/49.1 |
| 5,392,646 A | * | 2/1995 | Yajima | 73/204.19 |
| 5,596,969 A | * | 1/1997 | Lipinski | 123/494 |
| 5,637,789 A | * | 6/1997 | Lawson | 73/40.5 R |
| 5,918,268 A | * | 6/1999 | Lukas et al. | 73/40.5 R |

FOREIGN PATENT DOCUMENTS

| | | | | |
|---|---|---|---|---|
| JP | 57153237 | * | 9/1982 | 73/861.02 |

* cited by examiner

*Primary Examiner*—Hezron Williams
*Assistant Examiner*—C D Garber
(74) *Attorney, Agent, or Firm*—Lawrence E. Laubscher, Jr.

(57) ABSTRACT

A leak detection method and apparatus is characterized by the production of analog signals representative of the fluid inlet flow and fluid outlet flow of a closed system. The signals are compared, and a difference signal is generated which is a function of changes in the flows. This signal is processed to provide an indication of a leak within the system. By processing the analog signals, more accurate measurement of fluid differential, and thus fluid leakage, is obtained.

7 Claims, 2 Drawing Sheets

METHOD AND APPARATUS FOR DETECTING LEAKS

BACKGROUND OF THE INVENTION

In all industries, there are closed circuit systems in which fluid inflow and outflow are monitored in order to discover leaks. Typical examples of these are closed cooling water systems or hydraulic systems. In many systems of this type, even small leaks can-have devastating consequences. For example, in the cooling water systems of various melting furnaces, a very small leak allows water to penetrate into the melt, thereby causing serious explosions. Accordingly, the detection of this type of leak is of great importance.

BRIEF DESCRIPTION OF THE PRIOR ART

It is known in the art to separately measure the inflow and outflow of a closed system and then calculate the difference between the two to obtain an indication of a fluid leak in the system. If there are no leaks, the difference is zero.

Since the flow measurements usually involve large values, it is difficult to determine small differences owing to limitations. in the accuracy of the measuring equipment and techniques of the prior art. The present invention-was developed in order to overcome this drawback by providing a more accurate process for detecting leaks, and particularly small leaks, in a closed circuit.

SUMMARY OF THE INVENTION

Accordingly, it is a primary object of the invention to provide a method and apparatus for detecting fluid leakage in a closed system wherein the fluid input and output of the system are measured and analog signals corresponding to the measured values are produced and compared to provide a difference signal. The difference signal is processed and the output indicates the severity of a fluid leak. If the difference signal is zero, then there are no leaks in the system.

According to a more specific object of the invention, a calorimeter measuring system is used to measure fluid input and output. The analog signals are compared in a bridge circuit to produce the difference signals. Accordingly, even a very small difference between the analog signals creates a significant output signal resulting in a high sensitivity in leak detection.

According to a further object of the invention, a threshold level for the difference signal is established and when the threshold is exceeded, corrective action may be taken to prevent damage to the system.

BRIEF DESCRIPTION OF THE FIGURES

Other objects and advantages of the invention will become apparent from a study of the following specification when viewed in light of the accompanying drawing, in which.

DETAILED DESCRIPTION

Figure 1:
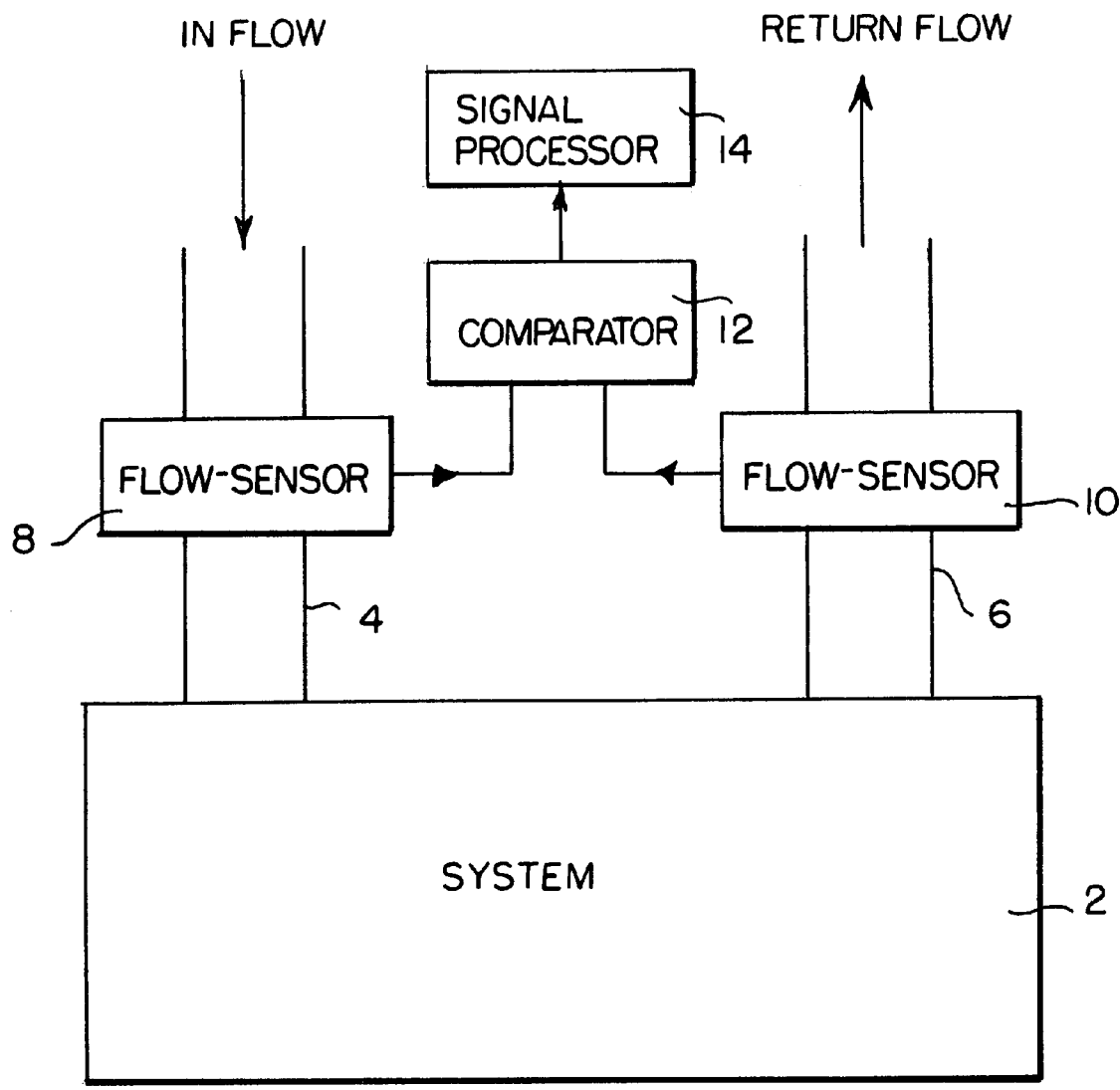
FIG. 1 is a schematic view of the leak detection apparatus according to the invention.

Referring first to FIG. 1, the leak detection method and apparatus according to the invention will be described. A closed system 2 has a fluid inlet 4 and a fluid outlet 6 in which flow sensors 8, 10 are arranged. The flow sensors are separate elements of the same type and produce analog signals in accordance with the fluid flow being detected at the inlet and outlet, respectively. These analog signals are sent to a comparator 12 which determines the difference between the analog signals. The comparator produces a difference signal which is delivered to a signal processor 14 which produces an output signal which is a function of the fluid leakage from the system 2. If there is no leakage, the difference signal is zero. Based on the output signal, an indication of the severity of a leak is provided. The signal processor can also establish a threshold level for the difference signal. If the difference signal exceeds the threshold, then emergency action such as shutting down the closed system may be taken to prevent damage to the system. This can be done manually or automatically. In an automatic mode, the signal processor issues a switching signal to curtail or shut down the system.

Figure 2:
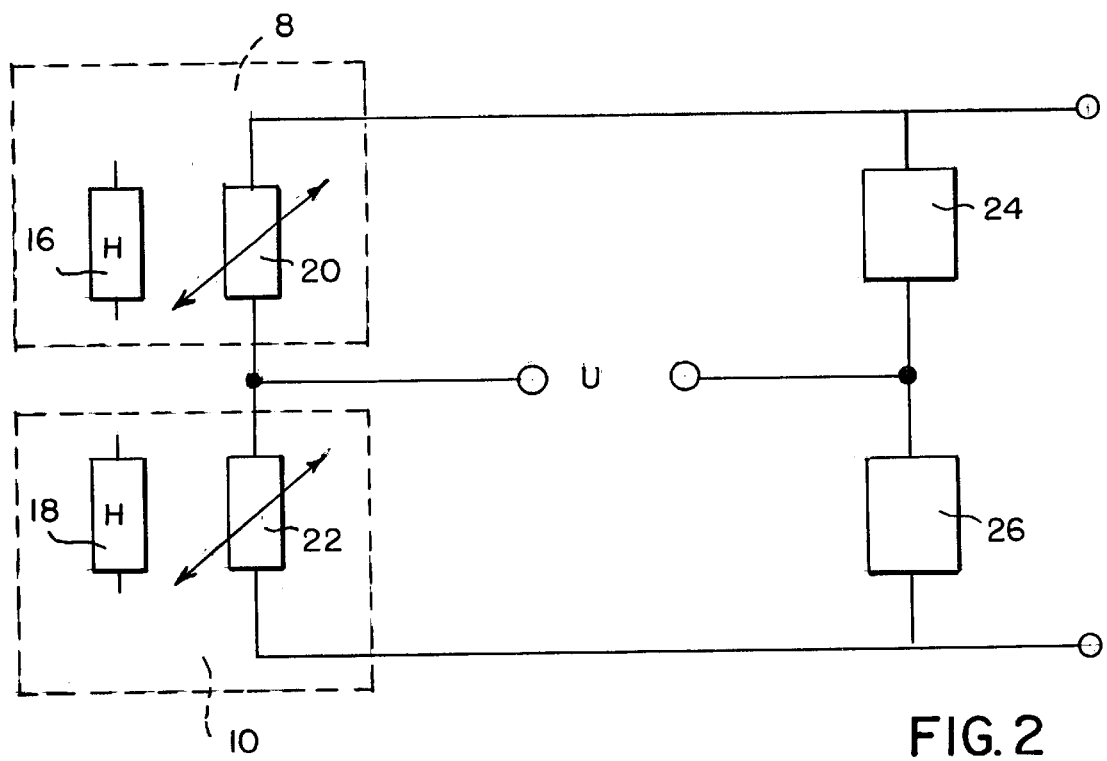
FIG. 2 is a circuit diagram of a first embodiment of the measuring system of the invention of FIG. 1.

In the embodiment shown in FIG. 2, a calorimeter technique for detecting leaks is shown. More particularly, each sensor 8, 10 comprises a thermistor including an electric heating element 16, 18 and a variable resistor 20, 22. The thermistor can be either a PTC resistor or an NTC resistor. The heating element elevates the temperature of the thermistor above the temperature of the fluid whose flow is being measured. The cooling effect on the thermistor of the fluid is a function of the flow rate. That is, the temperature differential between the thermistor and the ambient fluid diminishes as a function of the fluid flow rate.

The flow sensors 8, 10 are electrically connected in a bridge circuit with the sensor elements of the two lines forming one leg of the bridge. Resistors 24, 26 are also connected in the bridge circuit. As long as the inlet flow and the outlet flow are equal and no leaks are present in the system, the resistances of the sensors 8, 10 are equal. The bridge circuit is thus balanced and the bridge voltage measured at the terminals U is zero. However, if the inlet and outlet flows are unequal, the resistances of the sensors are also unequal and the bridge voltage has a value corresponding with the difference between the resistances which in turn is a measure of the disparity in flow rates.

Figure 3:
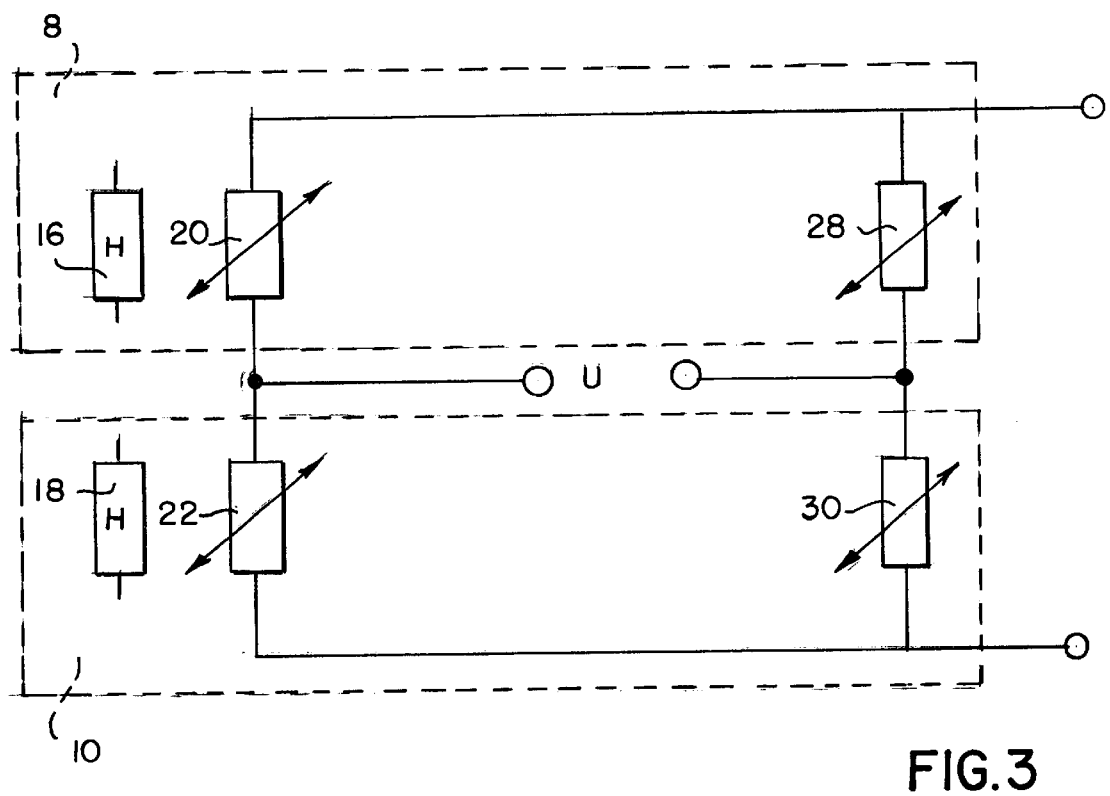
FIG. 3 is a circuit diagram of a second embodiment of the measuring system of the invention of FIG. 1.

The sensor arrangement shown in FIG. 2 is for situations where the temperature of the fluid at the inlet 4 and outlet 6 of the system is the same. In reality, the temperatures are rarely the same. Accordingly, it is necessary to compensate for the temperature differential. In the embodiment of FIG. 3, each sensor 8, 10 includes an unheated variable resistor 28, 30 which is used to measure the temperature of the fluid. With this determination, the temperature variation in the fluid can be eliminated from the flow detection process so that the bridge measurement at the terminals U is independent of fluid temperature.

The principle of flow measurement with constant heating of the thermistors described above with reference to FIG. 2 is very simple and is accurate only in connection with low flow rates. For measurement of higher flow rates, there are other calorimetric or heat dissipation principles of measurement which can be used. For example, the elevated temperature may be held constant by a control circuit. Alternatively, heat is supplied to the thermistors in pulses and the difference signal is derived from the heating or cooling time. These principles of measurement for leakage detection can also be applied to other calorimetric measuring processes.

Other principles of flow measurement may also be used. For example pressure differentials between inlet flow and outlet flow or magnetic-inductive principles of measurement can be used to convert the flow to be measured into analog signals. These signals can then be compared as in the calorimetric techniques described above.

While the preferred forms and embodiments of the invention have been illustrated and described, it will be apparent to those of ordinary skill in the art that various changes and modifications may be made without deviating from the inventive concepts set forth above.

What is claimed is:

1. A method for detecting fluid leakage in a closed system comprising the steps of
   (a) measuring the fluid input and the fluid output of the closed system using a calorimetric system and producing analog signals corresponding to the fluid input and fluid output;
   (b) comparing the fluid input analog signal with the fluid output analog signal in a bridge circuit adjusted to zero voltage under a no leak condition to produce a difference signal; and
   (c) processing said difference signal to provide an indication of fluid leakage from the closed system, said difference signal being zero when there is no fluid leakage, whereby minute leakage levels are detected and measured in accordance with said difference signal.

2. A method as defined in claim 1, wherein said processing step comprises one of analog and digital processing.

3. A method as defined in claim 2, and further comprising the steps of establishing a threshold level for said difference signal and detecting when said difference signal exceeds the threshold level.

4. Apparatus for detecting fluid leakage in a closed system, comprising
   (a) a first thermistor arranged in a fluid inlet to the system for generating a first analog signal corresponding to the fluid input;
   (b) a second thermistor arranged in a fluid outlet from the system for generating a second analog signal corresponding to the fluid output;
   (c) a bridge circuit wherein said first and second sensors comprise first and second legs thereof, said bridge circuit being adjusted to zero voltage under a no leak condition and comparing said first and second analog signals to produce a difference signal; and
   (d) means for processing said difference signal to provide an indication of fluid leakage from the closed system, said difference signal being zero when there is no fluid leakage, whereby minute leakage levels are detected and measured in accordance with said difference signal.

5. Apparatus as defined in claim 4, wherein said thermistors comprise a heating element and a variable resistor, said variable resistor having a resistance value which changes as a function of fluid flow.

6. Apparatus as defined in claim 5, wherein said thermistors further include temperature compensation devices, respectively, which eliminate a temperature differential in the fluid input and the fluid output from the measurement thereof.

7. Apparatus as defined in claim 6, wherein each of said temperature compensation devices comprises a second variable resistor spaced from said heating element.

* * * * *